United States Patent
Wehner et al.

(10) Patent No.: US 6,206,035 B1
(45) Date of Patent: *Mar. 27, 2001

(54) SAFETY DEVICE FOR A FUEL TANK

(75) Inventors: Holger Wehner; Jürgen Ehinger, both of Frankfurt (DE)

(73) Assignee: Mannesmann VDO AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,490

(22) Filed: Aug. 28, 1998

(30) Foreign Application Priority Data

Aug. 30, 1997 (DE) .............................. 197 37 948

(51) Int. Cl.[7] .................. B67D 5/08; E03B 5/00; F16K 31/02
(52) U.S. Cl. .................. 137/565.16; 137/565.01; 137/565.24; 137/343; 137/351; 123/497; 123/510
(58) Field of Search ................ 137/115.13, 115.26, 137/343, 351, 565.01, 565.13, 565.15, 565.16, 565.24, 590; 123/497, 509, 510, 514

(56) References Cited

U.S. PATENT DOCUMENTS

| 3,963,408 | 6/1976 | Youngberg . |
| 5,642,718 | * 7/1997 | Nakai et al. ................... 123/497 |
| 5,785,032 | * 7/1998 | Yamashita et al. ............. 123/509 |

FOREIGN PATENT DOCUMENTS

| 4214076A1 | 11/1992 | (DE) . |
| 0754852A3 | 1/1997 | (EP) . |
| 0898073A1 | 2/1999 | (EP) . |
| 08232792 | 9/1995 | (JP) . |
| 09032674 | 2/1997 | (JP) . |
| 9323665 | 11/1993 | (WO) . |
| WO98/42973 | 10/1998 | (WO) . |

\* cited by examiner

Primary Examiner—Timothy L. Maust
(74) Attorney, Agent, or Firm—Mayer, Brown & Platt

(57) ABSTRACT

A safety system for use in a motor vehicle fuel system in which fuel flow components generate electrostatic charges. The system includes a fuel pump that has a housing that is electrically connected to ground potential and an electrically conductive safety device that connects each fuel flow component to the fuel pump housing for discharging static electricity to ground through the fuel pump housing.

5 Claims, 3 Drawing Sheets

SAFETY DEVICE FOR A FUEL TANK

Figure 1:
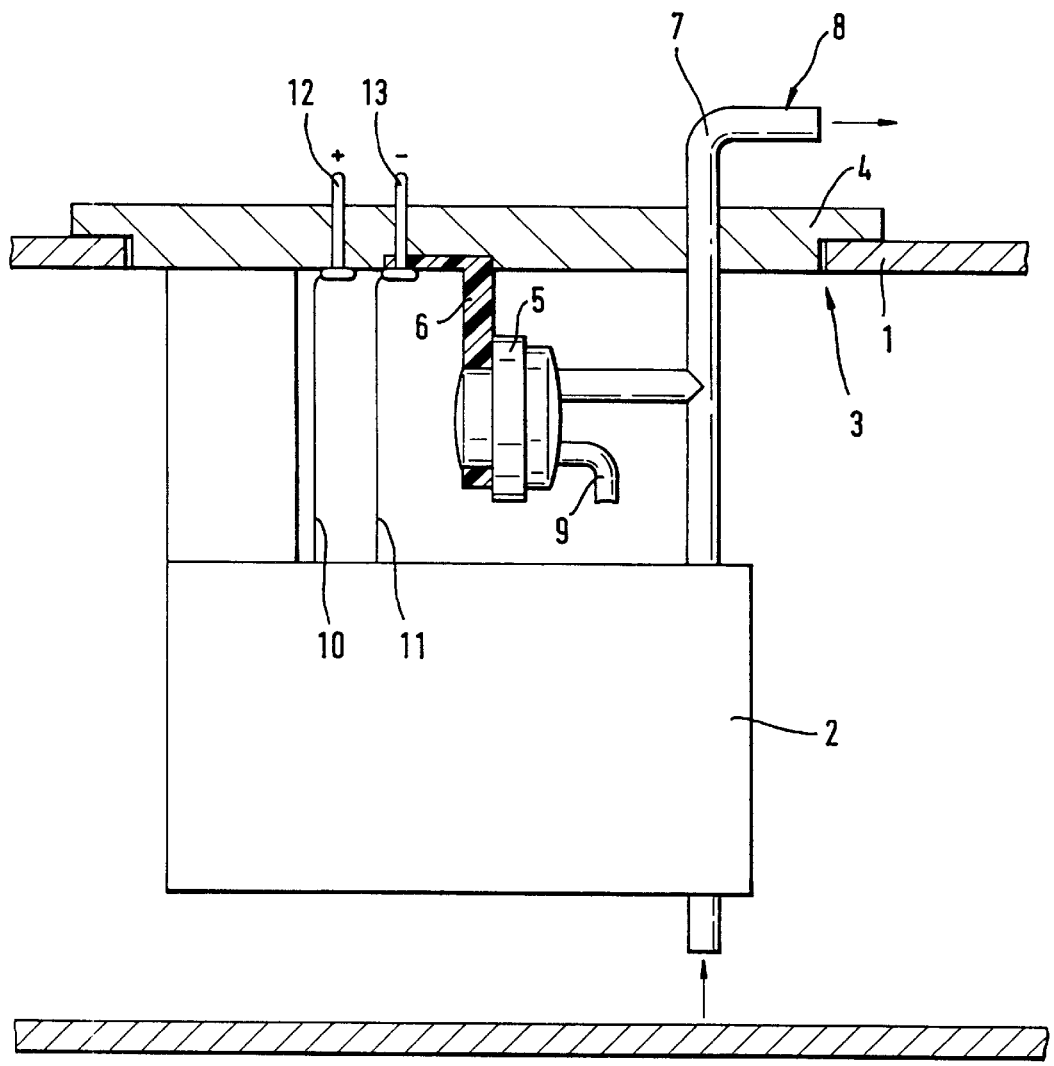

The subject matter of the invention is a safety device for the avoidance of electrostatic charges in fuel tanks, particularly those of motor vehicles. This safety device is arranged on components, preferably the fuel filter and pressure regulator, which are located in the interior of a fuel tank.

A large number of different components are arranged in the fuel tanks of present-day motor vehicles. Consistent with their function, rapidly flowing fuel flows through some of them. Included are fuel pumps and recently, the pressure regulator arranged in the fuel tank in so-called non-return fuel supply systems. Both fuel pumps and pressure regulators have metal parts which build up an electrostatic charge due to the fuel rapidly flowing through them. While these electrostatic charges on the fuel pump are discharged via the electrical bonding, this possibility does not exist with a pressure regulator since it is only in contact with electrically insulating plastic parts. Thus there is the danger that the electrostatic charges may be released in the form of an electrical flashover which can result in a dangerous deflagration in a fuel tank.

Furthermore, fuel filters are also components through which fuel flows in which the higher demands on the filtration of the fuel has resulted in a strong reduction of the mesh size of the filter. A concomitant increased friction between the rapidly flowing fuel and the filter mesh also results in an electrostatic charge. Since the filters often have a housing or support made of non-conducting plastic, the actual filter medium being comprised of either plastic or a metallic material such as a fine wire braided fabric, the accumulating electrostatic charges cannot be dissipated in this case also.

The object of the invention is to avoid electrostatic charges on components in fuel tanks at low expense.

According to the invention, the objective is attained with the features of claim 1.

Advantageous embodiments are described in claims 2 to 9.

The electrostatic charges of the components in the fuel tank are effectively discharged by the arrangement of an electrically conductive safety device between the components and a part of the motor vehicle which is in contact with ground potential.

The advantage of the invention consists in the fact that the arrangement of an electrically conductive safety device eliminates the danger of arcing in the fuel tank. The arrangement of this safety device has the further advantage that no modification of the components or their arrangement is required and also the assembly process continues to be unchanged down to the safety device.

It is particularly advantageous if the electrically conductive safety device is a wire which is connected on the one hand with the components such as the fuel filter and pressure regulator and on the other hand with a part of the motor vehicle in contact with ground potential.

The effect of the safety device is increased if this connection is as short as possible. It is thus advantageous to utilize ground potentials already present in the fuel tank. One of these ground potentials is the electrically conductive housing of the fuel pump or the negative pole of the power supply for the fuel pump or the negative pole of the power supply of a fuel level sensor. In addition, short paths for the electrically conductive connection are cost-effective.

In a further embodiment of the invention, if the fuel filter is joined to the housing of a fuel pump, the support or the housing of the fuel filter itself can be made of metal in a known manner, which however, is clearly more expensive than plastic material.

With non-conductive filter material, an attempt could also be made to discharge the electrical charge with a flat, conductive coating. The desired effect is achieved in a substantially simpler and more cost-effective manner if the filter material itself is electrically conductive, e.g., made up of a fine wire braided fabric or an electrically conductive material in a known manner.

A floating electrical conductor such as a flexible lead could be used which would be fixed in an electrically conducting manner to the filter material on the one hand and to the pump housing on the other. However, for quick and reliably correct mounting, it is highly advantageous if the pump-side end of the safety device is fixedly arranged on the support or housing so that when it is connected, it must inevitably come into electrically conducting contact with the pump housing. No special operation is then required to produce the electrical contact.

A trouble-free flow of the fuel filter is assured if the safety device is arranged outside the flow area of the connection area between the fuel filter and pump. With an internal safety device, turbulences and unavoidable vibrations of the liquid flow could cause the development of undesirable noise or noise amplification.

The long-term reliable discharge of charges is promoted if the safety device is mounted to the pump housing with spring bias. For a reliable contact, it is furthermore of advantage if at least one sharp edge of the safety device is in contact with the pump housing, since slight relative motions caused by vibrations of the pump housing will then reliably remove any oxidation layers that may occur.

If the component is a pressure regulator, a wire is also particularly advantageous as an electrically conductive safety device. In the simplest case, the wire is soldered to the subhousing of the pressure regulator. In this way, no additional connecting elements are required.

According to another advantageous further development of the invention, the wire is fixed to a clamping ring fastened to the pressure regulator.

A further contribution to the simplification of the mounting of the wire is made if it is attached to a locking element provided on a bracket for the mounting of the pressure regulator which is required in any event for the attachment of the pressure regulator; aside from the wire this does not require any additional components.

According to an additional advantageous embodiment, the safety device is a bracket for the pressure regulator, the bracket being made of a conductive plastic and has a connection with a part of the vehicle in contact with ground potential.

The pressure regulator can be easily combined with all the parts to be connected to it into a unit which can be preassembled and tested in the fuel tank before installation if the bracket is made of one piece with a feeder unit.

Figure 4:
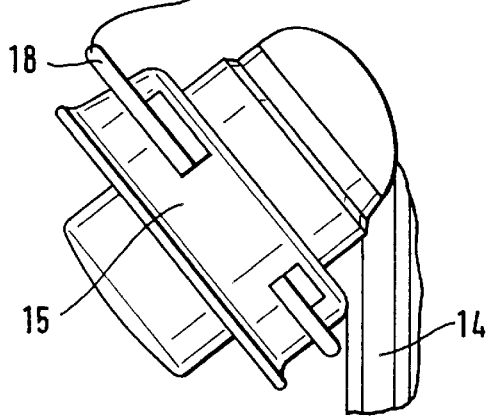
Figure 5:
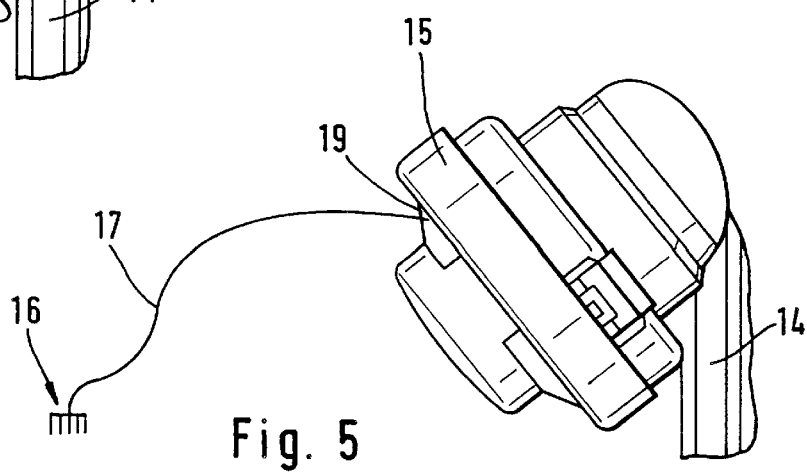
Figure 6:
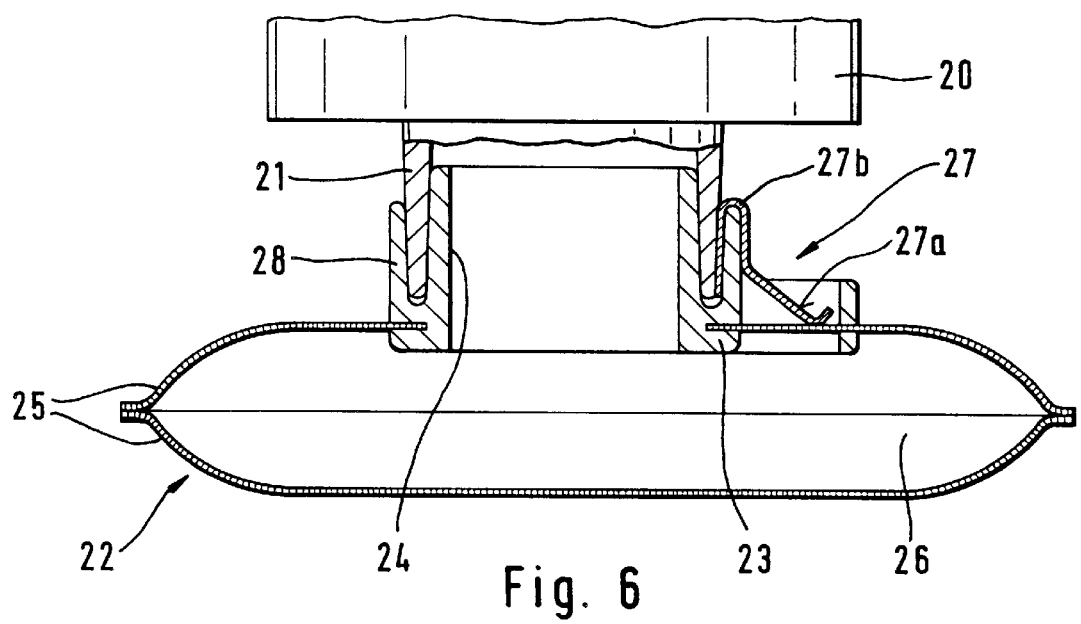
Figure 7:
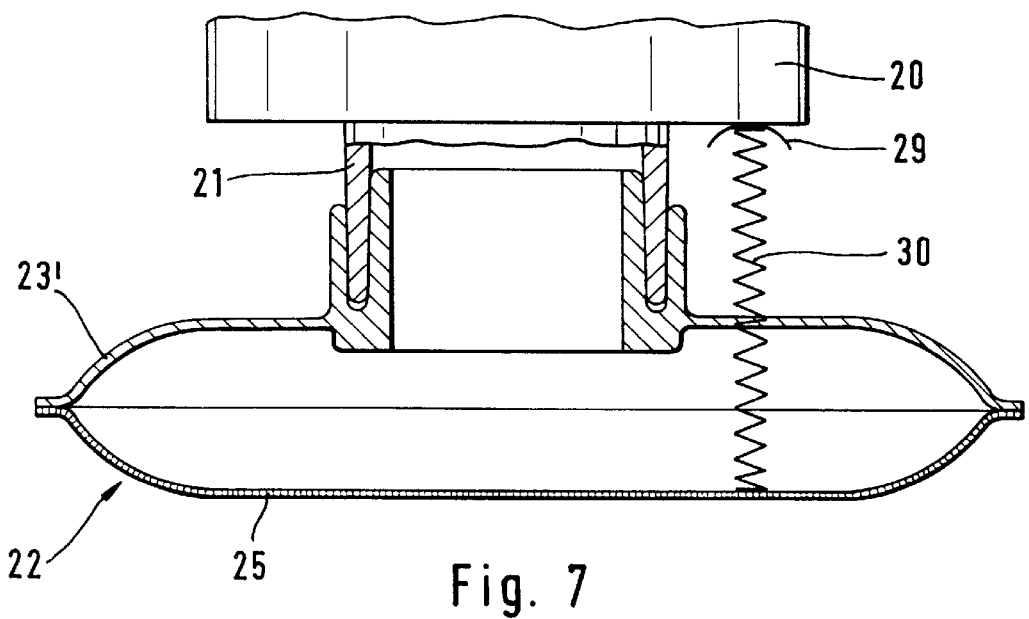

The invention allows numerous embodiments. To further illustrate its basic principle, the safety device is illustrated in connection with a fuel filter and a pressure regulator in the drawings in which:

FIG. 1 shows a schematic representation of a feeder unit of a fuel supply system with a pressure regulator, FIGS. 2–5 show several embodiments of the electrically conductive safety device on a pressure regulator, FIG. 6 shows the electrically conductive safety device as a spring clasp on a fuel filter and FIG. 7 shows the electrically conductive safety device comprised of a spring and a contact between a fuel filter and a fuel pump.

FIG. 1 schematically shows a feeder unit 2 arranged in a fuel tank 1 of a motor vehicle. The feeder unit 2 is fixed in a flange 4 inserted into an opening 3 of fuel tank 1. In addition, a pressure regulator 5 is located in fuel tank 1. Pressure regulator 5 is fixed to flange 4 via a bracket 6. Feeder unit 2 feeds fuel to a connection 8 located outside fuel tank 1 via a delivery line 7. A delivery line, which is not shown, leading to an internal combustion engine of the motor vehicle can be connected to this connection 8. Pressure regulator 5 has one connection each with delivery line 7 and a line 9 leading into fuel tank 1. Feeder unit 2 is supplied with electrical power via electrical leads 10, 11. Electrical leads 10, 11 have a connection with plug-in contacts 12, 13, arranged on the outside of flange 4. Bracket 6 is fixed to plug-in contact 13 which forms the negative pole. Bracket 6 is made of conductive plastic and has contact with a housing part of pressure regulator 5 made of electrically conductive plastic. This avoids an electrostatic charge of pressure regulator 5.

Figure 2:
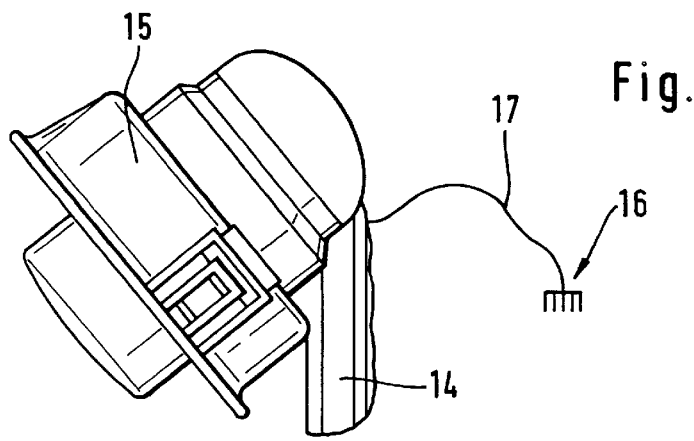

FIG. 2 shows a pressure regulator 15 fixed to a bracket 14. The housing of pressure regulator 15 is made of metal and is thus electrically conductive. Bracket 14 is comprised of a conductive plastic and is connected to a point 16 which is connected to ground potential via a wire 17.

Figure 3:
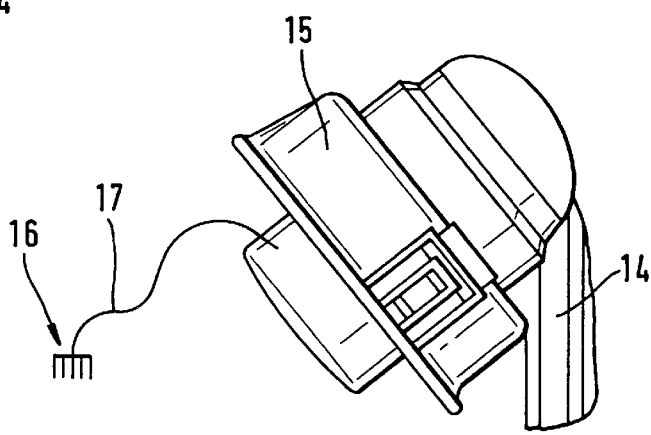

FIG. 3 shows pressure regulator 15 and bracket 14 from FIG. 2. In this case, wire 17 which is connected to point 16 which is in contact with ground potential is directly fixed to the housing of pressure regulator 15.

FIG. 4 shows pressure regulator 15 and bracket 14 from FIG. 2. In this case, pressure regulator 15 is fixed to bracket 14 via a locking clamp 18 made of metal. Wire 17 for the grounding of pressure regulator 15, the wire being connected to point 16 which is in contact with ground potential, is in this case fixed to locking clamp 18.

FIG. 5 shows pressure regulator 15 and bracket 14 from FIG. 2. Wire 17 for the grounding of pressure regulator 15 with point 16 which is in contact with ground potential is fixed to a clamping ring 19. Clamping ring 19 is secured by friction to a cylindrical section of pressure regulator 15.

According to FIG. 6, an intake fitting 21 is formed in one piece with a partially shown metallic housing 20 of a pump or it is in any event connected to it as to be electrically conductive. Housing 20 is normally connected to the vehicle ground; such housings and suction connections are usually made of aluminum die castings.

A filter 22 surrounds a support 23 with a connecting sleeve 24 and an electrically conductive filter material 25 which is fixedly joined to support 23. Connecting sleeve 24 has been coaxially pushed onto intake fitting 21 of the self-priming pump. Filter material 25 is here designed in the well-known manner to have two plies. Its plies which are fixedly joined at the edges enclose a hollow space 26, into which connecting sleeve 24 opens.

When the pump is operated within a fuel tank, whereby at least the lower edge of intake fitting 21 is still covered by liquid, drawn-in liquid initially flows through the fine-meshed filter material 25 from all sides and then through connecting sleeve 24 and intake fitting 21 into housing 20. In this connection, filter material 25 can become electrostatically charged with high voltage levels as a result of friction. This effect occurs primarily, but not exclusively, when relatively viscous diesel fuel is filtered. However, the filter described here is not limited to its application as a diesel filter.

In order to discharge the electrostatic charges, a metallic spring clasp 27 is fixedly joined to support 23. The first end 27a of the spring clasp is in contact with the top of filter material 25 by spring bias outside hollow space 26. A second end 27b of spring clasp 27 is U-bent similar to a hairpin. Its two legs enclose an annular collar 28 between them in which annular collar coaxially surrounds the outside of connecting sleeve 24.

The leg of the second spring clamp end 27b located between annular collar 28 and connecting sleeve 24 inevitably comes into contact with intake fitting 21 of housing 20 when filter 22 is pushed on or is in its installed state. This produces an electrically conductive connection between filter material 25 and housing 20 and consequently to the vehicle ground, which reliably prevents the occurrence of electrostatic charges Although its function is the same, the filter variant in FIG. 7 differs from FIG. 6 in that in this case, a support 23' forms a dome over the one or two-ply filter material 25. Thus it is not possible to produce a direct connection from the top of filter material 25 to housing 20 for the discharge of electrostatic charges. It is schematically suggested here that instead, a rounded or pointed filter contact 29 is pressed against housing 20 from the intake side by an electrically conductive pressure spring 30, whereby pressure spring 30 penetrates the flat support 23' without contact with connecting sleeve 24. As the result of vibrations of housing 20 during operation of the pump, filter contact 29 with its small contact surface or contact edge carries out slight rubbing motions on the housing so that any oxide layer that might possibly arise is reliably removed and a good electrical contact is always assured. Pressure spring 30 can be fixedly joined to support 23', by injection for instance, so that only its free ends are movable. These free ends must then be in contact with filter material 25 with sufficient spring bias on the one hand and press against filter contact 29 on housing 20 on the other hand.

In addition, both variants have in common that spring clasp 27 and pressure spring 30, each of which is embodied as an electrically conductive safety device, are arranged in the connection area outside the flow area in order to avoid disturbances of suction flow.

What is claimed is:

1. A safety system for use in a fuel tank, particularly for motor vehicles, comprising:
    (a) a fuel pump having a housing electrically connected to ground potential;
    (b) a fuel flow component associated with the fuel pump, which component tends to build up electrostatic charges during use, and;
    (c) an electrically conductive safety device connected between the fuel pump housing and the fuel flow component.

2. A safety system according to claim 1 wherein the safety device is a wire.

3. A safety system as defined in claim 1 wherein the safety device is a spring element mounted between the fuel pump housing and the fuel flow component.

4. A safety system as defined in claim 3 wherein the spring element is attached at one end only to either the fuel pump housing or to the fuel flow component.

5. A safety system as defined in 1 wherein the fuel flow component is a filter.

* * * * *